March 31, 1970     A. HEIMLER     3,503,655

HYDRAULIC BRAKING SYSTEM

Filed Dec. 27, 1968     2 Sheets-Sheet 1

United States Patent Office 3,503,655
Patented Mar. 31, 1970

3,503,655
HYDRAULIC BRAKING SYSTEM
Andre Heimler, Montreuil, France, assignor to
Societe Anonyme D.B.A.
Filed Dec. 27, 1968, Ser. No. 787,417
Claims priority, application France, Dec. 27, 1967,
133,848
Int. Cl. B60t 8/06
U.S. Cl. 303—21                                     2 Claims

---

ABSTRACT OF THE DISCLOSURE

A hydraulic brake system comprising a master cylinder, a power braking device, an antiskid device, and a set of wheel brakes. The power braking device develops pressure in proportion to that developed by the master cylinder. The pressures developed by the master cylinder and power braking device are compared in a valve means. The valve means allows the higher of these two pressures to actuate the set of wheel brakes through the antiskid device. This arrangement allows the master cylinder to actuate the brakes in event of failure of the power braking device without further actuation of the master cylinder.

---

Figure 1:
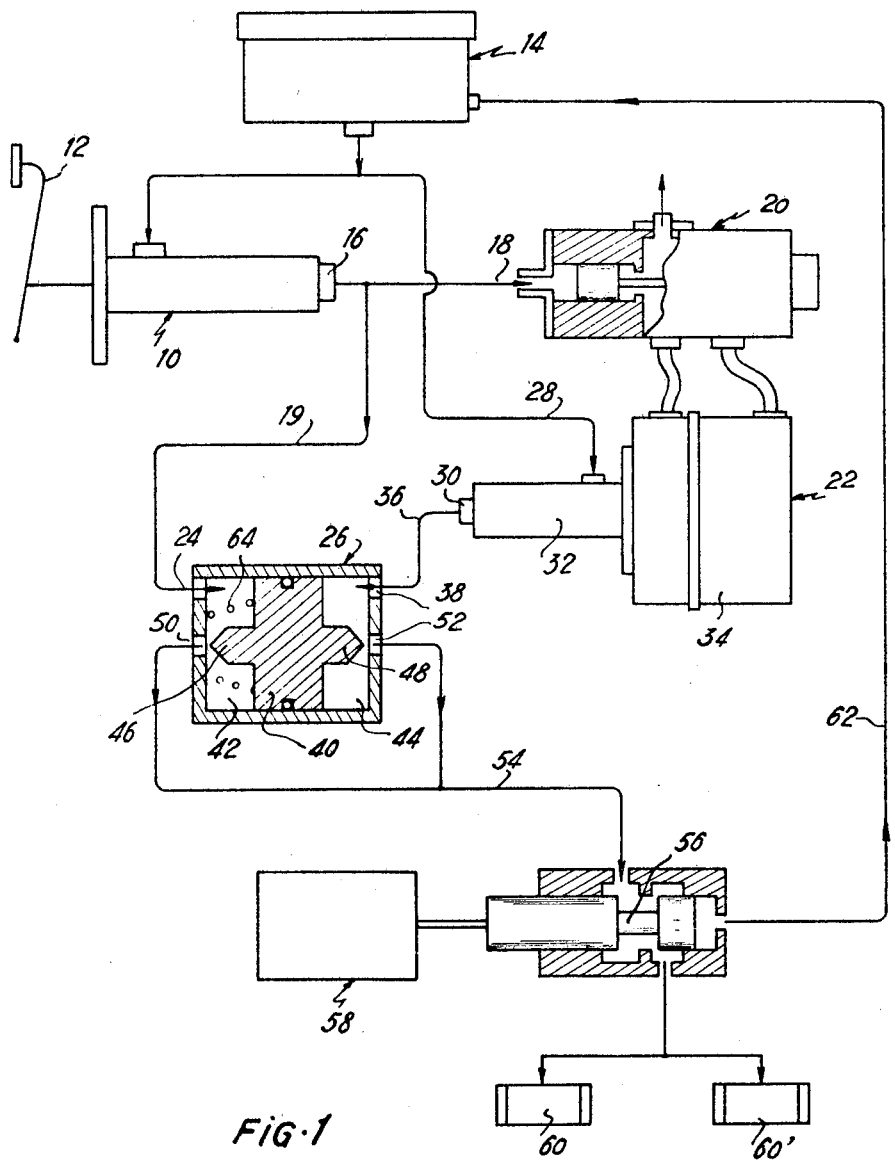

This invention relates to a hydraulic braking system and more particularly to a hydraulic braking system for preventing the skidding of the wheels of the vehicle occurring upon braking operation.

It has been already proposed to control the hydraulic connection between the master cylinder and the wheel cylinders by an antiskid control valve adapted to connect the wheel cylinders either with the master cylinder upon normal braking operation or with a low pressure hydraulic source in the event of a skidding of the wheel the braking of which is controlled by these wheel cylinders, to allow this wheel to be moved again in rotation. But with such hydraulic braking systems when wheel-skidding occurs, it is necessary to further push down the brake pedal to restore the hydraulic pressure in these wheel cylinders after the latter have been connected to the low pressure hydraulic source by the antiskid control valve. It results therefrom that, upon a heavy and long braking control operation causing the antiskid control valve to operate, the brake pedal will be more and more pushed inwardly to finally engage the floor of the vehicle so that no braking effect can be further obtained without fully releasing the brake pedal for restoring hydraulic fluid in the master cylinder. Such a drawback is as unpleasant for the driver as it is dangerous.

According to the main feature of the invention there is provided a hydraulic braking system of the type comprising a master cylinder operative to control the hydraulic braking pressure to a set of wheel cylinders, and an antiskid control valve operatively connected to be actuated by known per se deceleration responsive means for connecting said wheel cylinders either with said master cylinder or with a hydraulic reservoir according to the skidding of the wheel(s) as sensed by said deceleration responsive means said braking system being characterized in that it further comprises a power control device connected to be controlled by the braking pressure from said master cylinder for delivering a second hydraulic braking pressure varying as a function of the first named braked pressure to said wheel cylinders through said antiskid control valve, valve means responsive to the differential between said first and said second braking pressures being provided upstream of said antiskid control valve to connect this latter either with the power control device or with the master cylinder depending upon whether the said second braking pressure is above or below the first braking pressure from said master cylinder respectively.

It will be understood that with such a feature, the above mentioned drawback is avoided. In the normal power control operation of the power control device, the master cylinder is only operative to control same which, in turn supplies a high hydraulic braking pressure to the wheel cylinders through the above mentioned valve means and the antiskid control valve. In other words, the power control device is only used as a source of hydraulic braking pressure controlled as a function of the hydraulic pressure from the master cylinder, the brake pedal controlling same remaining thereby in a substantially constant position whatever the operation of the antiskid control valve may be. Furthermore, in the event of a failure or malfunction of the power control device, the master cylinder, due to the provision of the said valve means, is operative to apply the brakes by directly supplying hydraulic pressure to the wheel cylinders.

Figure 2:
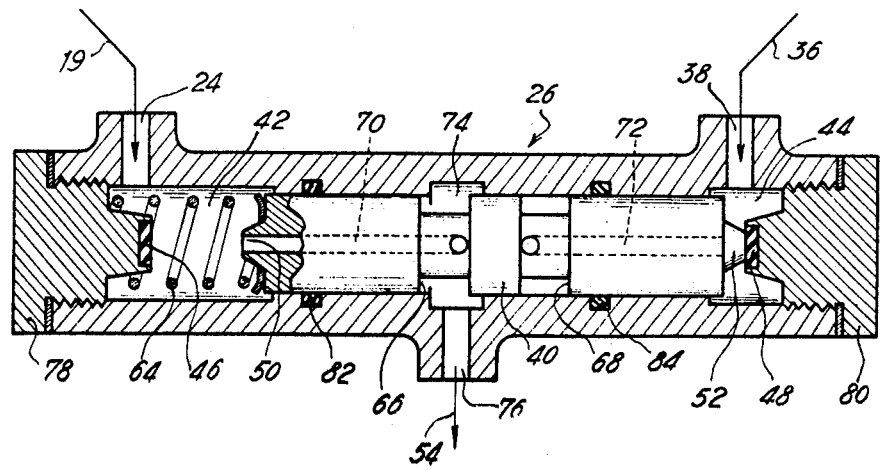
Figure 3:
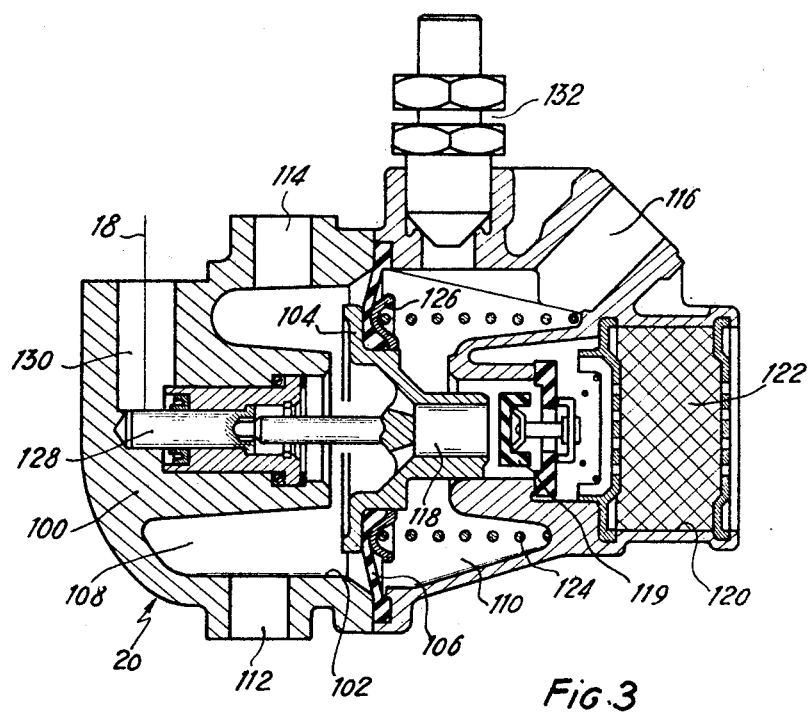

Other objects and advantages of the invention will appear from the following description taken in connection with the accompanying drawings wherein:

FIGURE 1 is a diagrammatic view of a hydraulic braking system according to the invention, FIGURE 2 is a cross sectional view of a preferred embodiment of the balancing valve diagrammatically shown in FIGURE 1 and, FIGURE 3 is a cross sectional view of a preferred embodiment of the control servovalve diagrammatically shown in FIGURE 1.

Referring now to FIGURE 1, reference numeral 10 designates a conventional master cylinder controlled by a brake pedal 12 to pressurize the hydraulic fluid from a reservoir 14. The outlet orifice 16 of the master cylinder is connected on the one hand to a fluid conduit 18 leading to a servovalve 20 controlling the operation of a conventional power control device 22 and on the other hand to a conduit 19 leading to an inlet orifice 24 of a balancing valve means 26. The power device 22 is connected by a fluid conduit 28 to the reservoir 14 and is adapted to pressurize the hydraulic fluid therefrom in such a manner that, upon actuation of the servovalve 20, the hydraulic high pressure at the outlet orifice 30 of the power control device 22 is at least equal and substantially proportional to the hydraulic pressure from the master cylinder controlling the servovalve 20. In the shown embodiment, the power control device is comprised, in a known per se manner, of a master cylinder 32 the main piston (not shown) of which is actuated by a vacuum suspended pressure responsive movable wall (not shown) responsive to a differential pneumatic pressure controlled by a servovalve 20, such as the one shown in FIGURE 3, operative to control a differential pneumatic pressure varying as a function of the hydraulic pressure from the master cylinder 10 as transmitted by conduit 18.

The outlet 30 of the power control device 22 is connected by a fluid conduit 36 to a second inlet orifice 38 provided in the balancing valve 26. The latter comprises a piston 40 slidably mounted in the casing of the valve 26 in which casing the piston defines a first and a second chambers 42 and 44 connected to the inlet orifices 24 and 38 respectively.

Piston 40 is provided with two opposed valve elements 46 and 48 adapted to sealingly cooperate with two outlet orifices 50 and 52 respectively depending upon the axial position of piston 40. It will be understood that, depending upon whether the pressure in the chamber 44, connected to the device 22, is above or below the pressure in chamber 42, connected to the master cylinder, the piston 40 is moved toward the left or the right respectively (as viewed in the FIGURE 1) so that the valve element 46 or 48 sealingly engages its corresponding outlet orifice 50 or 52 respectively to close the communication between inlet 24 with outlet 50 or between inlet 38 with outlet 52.

The two outlet orifices 50 and 52 are connected to a fluid conduit 54 leading to an antiskid control valve 56.

In a shown embodiment valve 56 is a spool valve operative, when actuated by a known deceleration responsive device 58 responsive to the deceleration of the wheel (or the wheels) of the vehicle, to connect the set of wheel cylinders 60 and 60' either with conduit 54 or with a fluid conduit 62 leading to the reservoir 14. It will be understood that in normal braking operation, the valve 56 remains in the position shown in FIGURE 1, and that upon skidding of the wheel(s) corresponding to the set of wheel cylinders 60 and 60', the deceleration responsive device 58 moves the spool valve 56 toward the left, as viewed in FIGURE 1, to connect the wheel cylinders to the reservoir for allowing the wheel(s) to be moved again in rotation.

It is to be noted that in a normal power condition, piston 40 is urged toward the left, against the force of a light resilient spring 64, to close the communication between the inlet 24 and the outlet 50. The master cylinder is only used to control the servovalve 20, the hydraulic pressure in the wheel cylinders being only supplied by the power device 22. Upon antiskidding operation of the valve 56, the device 22 is operative to restore the hydraulic braking pressure to the wheel cylinders without requiring a further downward displacement of the brake pedal 12. In the event of a failure or a malfunction of the power 22, the piston 40 of the balancing valve 26 is moved toward the right, as viewed in FIGURE 1, thereby allowing the direct actuation of the wheel cylinders by the hydraulic pressure from the master cylinder as in the prior antiskid devices.

Referring now to FIGURE 2, there is shown a preferred embodiment of the balancing valve diagramatically shown at 26 in FIGURE 1. The elements of FIGURE 2 which are similar to the one of the valve of FIGURE 1 are designated by the same reference numerals. In the embodiment of FIGURE 2, the piston 40 is defined by a spool valve having two annular groves 66 and 68 connected by inner passages 70 and 72 respectively to the chambers 42 and 44 respectively through the valves 46–50 and 48–52 respectively. Depending upon the position of the spool valve 40 within the casing 26 the grooves 66 or 68 communicates with an outlet groove 74 provided with an outlet orifice 76 connected, to conduit 54 of FIGURE 1. Plugs 78 and 80 threadedly secured in casing 26 sealingly close chambers 42 and 44 respectively, annular seals 82 and 84 warranting the fluid tightness of the connection between the groove 74 and the chambers 42 and 44 respectively.

In FIGURE 3, there is shown a preferred embodiment of the servovalve diagrammatically shown in FIGURE 1 at 20 for use with a vacuum suspended type servomotor 22 well known by any one skilled in the art. Such a servomotor 22 generally comprises an output rod actuated by a movable pressure responsive wall, such as an elastomeric diaphragm (not shown), for controlling inward displacement of the main piston of the master cylinder 32 (see FIGURE 1) connected to the servomotor.

The servovalve 20 mainly comprises a housing 100 defining a central chamber 102 in which a poppet valve element 104 is suspended by means of an elastomeric diaphragm 106 to thus define a reference chamber 108 and a control chamber 110. The reference chamber 108 is provided with an inlet port 112 and a first control orifice 114 suitably connected by fluid conduits (not shown) to a source of vacuum (not shown) such as the intake manifold of the motor and to one of the variable volume pressure chambers of the servomotor 22 respectively. Control chamber 110 is connected to the other of the variable volume pressure chambers of the servomotor 22 by external conduits (not shown) via a second control orifice 116. The valve element 104 is provided with axial passage 118 normally connecting the reference chamber 108 with the control chamber 110. Valve element 104 is adapted, when moved to the right, as viewed in FIGURE 3 to cooperate with a check valve element 119 operative to first close axial passage 108, and then to connect the control chamber 110 to the atmosphere via an exhaust opening 120 including a filter 122. A spring 124 is compressed between the housing 100 and a retainer 126 abutting valve element 104 to resiliently urge the latter toward the left as viewed in FIGURE 3. Valve element 104 is controlled by a piston 128 slidably mounted in housing 100 and responsive to the hydraulic pressure in an inlet control chamber 130 connected to the master cylinder 10 (see FIGURE 1) by conduit 18. A securing plug 132 is suitably secured to the housing 100 for permitting the positioning thereof on the servomotor casing.

It will be clearly understood that upon hydraulic actuation from the master cylinder 10 of FIGURE 1, piston 128 and valve element 104 engaged therewith are biased toward the right against the force of the spring 124 by the hydraulic pressure in chamber 130. Upon engagement of valve element 104 with the check valve 119, chamber 110 is first disconnected from chamber 108, which is connected to the vacuum source, and is then supplied by air from the atmosphere through valve 119 and filter 122. The unit defined by diaphragm 106 and valve element 104 is thus subjected to a differential pressure such that this latter unit is pressure balanced. The differential pressure controlling the servomotor 22 (see FIGURE 1) is thus substantially proportional to the control hydraulic pressure in chamber 130 connected to the control master cylinder 10 (see FIGURE 1), so that the output hydraulic pressure controlled by the servomotor varies substantially as a function and proportionally to the hydraulic pressure from the master cylinder 10, as explained hereinabove.

What is claimed is:

1. A hydraulic braking system of the type comprising a master cylinder operative to control the hydraulic braking pressure to a set of wheel cylinders, and an antiskid control valve operatively connected to be actuated by deceleration responsive means for connecting said wheel cylinders either with said master cylinder or with a hydraulic reservoir according to the skidding of the wheel(s) as sensed by said deceleration responsive means, said braking system being characterized in that it further comprises a power control device connected to be cotrolled by the braking pressure from said master cylinder for delivering a second hydraulic braking pressure varying as a function of the first named braking pressure to said wheel cylinders through said antiskid control valve, valve means responsive to the differential between said first and said second braking pressures being provided upstream of said antiskid control valve to connect this latter either with the power control device or with the master cylinder depending upon whether the said second braking pressure is above or below the first braking pressure from said master cylinder respectively.

2. A hydraulic braking system according to claim 1 characterized in that said power control device comprises an output master cylinder the main piston of which is actuated by a pressure responsive movable wall responsive to a differential fluid pressure controlled by a pilot valve assembly as a function of the braking pressure from said master cylinder.

References Cited

UNITED STATES PATENTS 3,330,113   7/1967   Perrino _____ 303—21 X

MILTON BUCHLER, Primary Examiner

JOHN J. McLAUGHLIN, Jr., Assistant Examiner

U.S. Cl. X.R.

188—181; 303—2, 13, 84